United States Patent
Pronold

(10) Patent No.: US 9,395,717 B2
(45) Date of Patent: Jul. 19, 2016

(54) METHOD AND DEVICE FOR REPORTING DISRUPTION IN THE GROUPING OF ARTICLES

(71) Applicant: KRONES Aktiengesellschaft, Neutraubling (DE)

(72) Inventor: Timo Pronold, Regensburg (DE)

(73) Assignee: Krones Aktiengesellschaft, Neutraubling (DE)

( * ) Notice: Subject to any disclaimer, the term of this patent is extended or adjusted under 35 U.S.C. 154(b) by 0 days.

(21) Appl. No.: 14/765,891

(22) PCT Filed: Feb. 6, 2014

(86) PCT No.: PCT/EP2014/052333
§ 371 (c)(1),
(2) Date: Aug. 20, 2015

(87) PCT Pub. No.: WO2014/124861
PCT Pub. Date: Aug. 21, 2014

(65) Prior Publication Data
US 2015/0370239 A1    Dec. 24, 2015

(30) Foreign Application Priority Data
Feb. 12, 2013 (DE) .......................... 10 2013 202 247

(51) Int. Cl.
G06F 7/00    (2006.01)
G05B 19/402    (2006.01)
(Continued)

(52) U.S. Cl.
CPC .............. *G05B 19/402* (2013.01); *B65G 43/08* (2013.01); *B65G 47/084* (2013.01); *B65G 47/24* (2013.01);
(Continued)

(58) Field of Classification Search
None
See application file for complete search history.

(56) References Cited

U.S. PATENT DOCUMENTS 6,508,351 B1    1/2003    Christoffersen et al.
6,934,607 B2    8/2005    Blaine
(Continued)

FOREIGN PATENT DOCUMENTS

DE    19930019    1/2001
DE    102006015689    10/2007
(Continued)

OTHER PUBLICATIONS

PCT/EP2014/052333—International Search Report dated Apr. 28, 2014.
(Continued)

*Primary Examiner* — Yolanda Cumbess
(74) *Attorney, Agent, or Firm* — Simmons Perrine Moyer Bergman PLC

(57) ABSTRACT

During grouping, articles (01) from an incoming article flow are grouped on a staging surface (02) and are transported away after completion of the grouping in order to make space for a new grouping. During grouping, the articles (01) are also detected by sensor with regard to their entry alignment and/or entry position in the article flow in order to subsequently bring them into a final alignment and final position corresponding to their arrangement in the grouping to be achieved. During grouping, the articles (01) located on the staging surface (02) are also detected by sensor. The method includes the steps: A.
obtaining an actual alignment and an actual position (03) of the articles (01) located on the staging surface (02) with the aid of the sensor detection; B.
recognizing mispositioned or fallen articles (05) by comparing the actual alignment and actual position (03) of the articles (01) with a desired alignment and a desired position in a desired state (04) of the articles (01) to be achieved in a grouping to be formed up to that point from the articles (01) that are located on the staging surface (02); and C.
if it is recognized that one or a plurality of articles (05) are in a wrong position or alignment:
issuing of a disruption message; and/or
interrupting of the grouping; or
automatic removing of the disruption by modifying the position and/or the alignment of the one or more articles (05), that are in a wrong position or alignment.

16 Claims, 1 Drawing Sheet

(51) Int. Cl.
  B65G 43/08 (2006.01)
  B65G 47/08 (2006.01)
  B65G 61/00 (2006.01)
  B65G 47/24 (2006.01)

(52) U.S. Cl.
  CPC ........ *B65G 61/00* (2013.01); *B65G 2203/0225* (2013.01); *B65G 2203/042* (2013.01); *G05B 2219/32298* (2013.01)

(56) References Cited

U.S. PATENT DOCUMENTS

| | | | |
|---|---|---|---|
| 7,870,943 B2 * | 1/2011 | Malini | B65G 35/38 198/376 |
| 8,442,671 B2 | 5/2013 | Beck et al. | |
| 8,636,137 B2 | 1/2014 | Weber | |
| 8,997,970 B2 | 4/2015 | Ehmer et al. | |
| 2007/0297695 A1 | 12/2007 | Aratani et al. | |
| 2008/0301072 A1 | 12/2008 | Nagatsuka et al. | |
| 2009/0065330 A1 * | 3/2009 | Lupton | B65G 43/08 198/357 |
| 2012/0236140 A1 | 9/2012 | Hazeyama et al. | |

FOREIGN PATENT DOCUMENTS

| | | |
|---|---|---|
| DE | 102011009181 | 7/2012 |
| GB | 2201647 | 9/1988 |
| WO | 2012152390 | 11/2012 |

OTHER PUBLICATIONS

DE 10 2013 202 247.6—German Search Report dated Jan. 27, 2014.
Chinese Application No. 201400008257.X—Chinese Office Action Dated Mar. 28, 2016.

* cited by examiner

METHOD AND DEVICE FOR REPORTING DISRUPTION IN THE GROUPING OF ARTICLES

PRIORITY CLAIM

The present application is a national stage application of International Application PCT/EP2014/052333, filed Feb. 6, 2014, which in turn claims priority to German Application DE 10 2013 202 247.6, filed Feb. 12, 2013, all of which are incorporated by reference.

FIELD OF THE INVENTION

The present invention relates to a method for reporting disruption during the handling of articles, in particular during the grouping of articles. The invention furthermore relates to a device for performing such a method.

BACKGROUND OF THE INVENTION

The handling of articles frequently involves grouping individual articles or several articles simultaneously into article layers, for instance, such that the article layers can later be stacked in a stacking station to form a stack, for instance, in which stack the article layers then form stack layers.

The articles can be, for instance, objects such as packaged or unpackaged objects, containers, cartons, or they can be bundles of a plurality of objects, with the objects of a bundle being held together, for instance, by means of a strapping, an outer packaging, such as a wrapping, a shrink tube, or a box, or a carrying structure, to mention just a few conceivable embodiments.

The grouping of articles into article layers, for instance, is carried out particularly effectively by means of so-called grouping stations, which can be operated fully automatic. Grouping stations can comprise one or a plurality of rotating stations, track switches, and/or also single- or multi-axle handling machines summed up under the term manipulator, which continually group articles on a staging surface from a single- or multi-lane incoming article flow into article layers, which are thereupon transported away after their completion in order to make space for a new article layer to be grouped.

In the process, the articles are detected by sensor with regard to their alignment and/or position in the single- or multi-lane incoming article flow in order to be able to subsequently manipulate them in correspondence to their grouping in the article layer to be achieved by means of one or a plurality of manipulators. Grouping stations are normally clock-controlled and they perform a sequence of steps defined for the articles to be presently grouped, independent of whether one or a plurality of articles in a grouping having been formed up to that point for attaining a desired article layer is or are in the correct arrangement or alignment and/or in the correct position or place that is necessary for the desired article layer to be achieved. The articles in the grouping having been formed by the manipulation up to that point are therefore also detected by sensor in order to recognize mispositioned or fallen articles. For this purpose, a plurality of light barriers is located in the area of the staging surface of a grouping station, which light barriers monitor the articles having been grouped up to that point and stop the grouping station if one or a plurality of articles is in a wrong position or in a wrong alignment.

Since mispositioned or fallen articles can lead to collisions with new incoming articles to be grouped if the grouping station continues to be operated, and, as a result, can in the best case lead to damaging the collided articles and in the worst case to damaging the grouping station or parts of it, grouping stations are shut down with a disruption message being issued if mispositioned or fallen articles in a grouping having been formed up to that point are detected by sensor.

The staging surface is emptied in order to remove the disruption. The grouping station thereupon takes up grouping a new article layer again by carrying out the first step of the sequence of steps.

Although for the most part flawless, the articles that were cleared out are treated as rejects, as they can only be reintegrated into the single- or multi-lane incoming article flow with substantial effort.

Besides the undesirably high number of rejects, the grouping station downtime necessary for completely emptying the staging surface and thus for the most part also the downtime of a complete production line preceding the grouping station, such as a filling line, for instance, is a substantial disadvantage of the known grouping stations. Emptying is particularly impeded by necessary occupational safety measures, which require the staging surface to be encapsulated at least during the operation of the grouping station, so that it takes up a similar amount of time to empty the staging surface as it would to empty a room that is difficult to access.

Mathematical detection of the spatial arrangement of objects on an infeed conveying device, alignment of the objects in a predefined manner by means of handling machines that are freely programmable in three axes, and evenly spaced transfer of the objects onto a further conveyor device for the purpose of placing the objects in a packaging unit are known from DE 37 04 423 A1. The further conveyor device feeds the objects to an insertion area, where the positioned insertion of the objects into the packaging unit is performed by means of inserting heads. The handling machines are controlled by a computer, which receives the position data and the arrangement data of the objects on the infeed conveying device from an optical detection system.

Determining the alignment of an object with flexible walls and changing it, if necessary, by means of a manipulator, are known from DE 600 34 527 T2. In that instance, the alignment is detected by means of a pattern detector, which detects a pattern on a surface of the object, and is identified by means of a processor, which compares the detected pattern with a respective number of predefined patterns representing respective alignments of the object.

From DE 10 2007 036 020 A1, the unified alignment of a stream of differently aligned, separate objects being transported within a specified angle area in differing alignment on a supply transport device is known to be effected by means of an interposed alignment transport device forming a stream of objects in equal alignment being transported away on a removal transport device. For that purpose, the separate objects being transported on the supply transport device are first detected with regard to their alignment by means of an image recording device or a camera system. Then one object after the other is transferred to the alignment transport device according to their separation on the supply transport device, which undergoes a rotation about a vertical axis in dependence on the alignment detected by means of the image recording device or of a camera system of the object respectively located on it, such that the objects are equally aligned and fed to the removal transport device one after the other.

Detection by means of an image recording device of articles being transported in an article stream by means of a conveyor device is known from EP 2 500 147 A2.

In that context, the image recording device first detects the entire length of the conveyor device. For the purpose of adapting the detection of individual articles in the article stream to differently dimensioned articles, a display is provided for presenting the image detected by the image recording device. Based on the size of a section of the detected image and by means of a user interface, it is possible to configure an area as a start condition for the detection of an article within which section an article to be detected is located. The size of this section corresponding to the dimensions of the article is determined by the relation of the area to the total length of the conveyor device.

SUMMARY OF THE INVENTION

The invention is based on the task of creating a method for reporting disruption in the handling of articles, in particular in the grouping of articles, which method reports a disruption in the grouping of articles, for instance for an article layer, and simultaneously facilitates identifying the cause thereof in order to facilitate and thus accelerate the removal of the cause of the disruption. It is furthermore a task of the invention to specify a device for performing such a method.

The task is respectively solved by the features of the independent claims.

Further advantageous embodiments of the invention are described in the dependent claims.

A first object of the invention thus relates to a method for reporting disruption in the grouping of articles. During the grouping, articles from a single- or multi-lane incoming article flow are continually grouped into article layers, for instance, on a movable staging surface, for instance on a staging surface that is moved along at least in sections with the article stream, or on a stationary staging surface, which article layers are thereupon further transported or transported away after their completion in order to make space for a new grouping to be grouped.

In the process, the articles are detected by sensor with regard to their entry alignment and/or entry position in the single- or multi-lane incoming article flow in order to subsequently manipulate them in a final alignment and final position corresponding to their arrangement in the grouping to be achieved by means of, for instance, one or a plurality of manipulators. The alternatively optional or combinatorial linking of the sensor detection of the articles in the single- or multi-lane incoming article flow with regard to their entry alignment and/or entry position in this context illustrates that it is not mandatory to detect the entry alignment and the entry position in advance. It is indeed also possible that the articles always, in any event, arrive in the single- or multi-lane incoming article flow in equal alignment. In this instance, a detection of the articles with regard to both their entry alignment and their entry position is superfluous, and it can suffice to detect merely their arrival, for example, by means of a light barrier or the like, for example. It is also conceivable that the one detection of entry alignment and entry position is uncalled for if the articles are symmetrical, in particular rotational-symmetrical with regard to their base surface on which the articles arrive standing in the single- or multi-lane incoming article flow, and/or if the articles arrive guided such between lane separators, for instance, that they cannot take any other entry position, for instance.

Furthermore, the articles on the staging surface located in the arrangement having been formed by the manipulation up to that point are also detected by sensor in order to recognize mispositioned or fallen articles.

In this instance, an effective actual alignment and actual position of the articles located on the staging surface is acquired by means of the sensor detection of the articles on the staging surface in the arrangement having been formed by the manipulation up to that point.

The acquisition of the actual alignment in that context preferably not merely relates to the two-dimensional plane, but to three-dimensional space. It is conceivable, for example, that it is not required to detect the actual alignment in a planar relation in the instance of the previously described articles, which are symmetrical with regard to the geometry of their base surface, for example, because a rotation about their symmetry axis standing upon the base surface would have no effect with regard to the grouping to be achieved. With the detection in a spatial relation, on the other hand, it would be possible to recognize, for instance, whether an article has fallen and its longitudinal axis, which in the desired state stands vertically upon the staging surface, for example, is now lying in parallel to the staging surface, for example.

The recognition of mispositioned or fallen articles is then performed by comparing the effective actual alignment and the actual position of the articles located on the staging surface in the arrangement having been formed up to that point by the manipulation with a desired alignment and a desired position of the articles to be achieved in a grouping to have been formed up to that point by the manipulation from the articles that are located on the staging surface.

If it is determined by the preferably permanently performed monitoring by way of sensor detection of the articles having been grouped up to that point and by way of the comparison of the actual alignments and the actual positions of the articles on the staging surface with the desired alignments and the desired positions of the articles in the grouping having been formed up to that point that one or a plurality of articles are located in the wrong position or in a wrong alignment, a disruption message is preferably issued. Alternatively or additionally, the grouping is interrupted if it is recognized that one or a plurality of articles are located in a wrong position or in a wrong alignment. As an alternative or in addition to an issue of a disruption message as well as to an interruption of the grouping, an automatic removal of the disruption can be performed by a robot, for instance, by way of modifying the position and/or the alignment of the one or of the plurality of articles, which is or are in a wrong position.

The robot in particular comprises at least one gripper arm, with which it can grip, shift, rotate, and/or move one or a plurality of articles, which are misaligned or mispositioned, and subsequently move them into a desired position and/or align them in a desired alignment.

The method can moreover provide that one or a plurality of articles are marked, which articles are located in a wrong position or in a wrong alignment on the staging surface and/or in the grouping having been formed up to that point, for instance because they were lost or have fallen while being brought to a position corresponding to their final position within a grouping to be formed.

The sensor detection of the actual alignments and the actual positions of the articles on the staging surface is preferably performed with the aid of image detection as is known by way of cameras, for instance by means of one or a plurality of imaging sensors, and also by an object recognition algorithm with which the articles can be recognized with regard to their alignment and arrangement within the area being monitored by the image detection means, which preferably covers the entire staging surface.

The issue of the disruption message is preferably performed with the simultaneous presentation on a display device, such as a screen, a monitor, or a display, of the image detected with the aid of the image detection means and/or of the articles recognized on the staging surface in their actual alignments and actual positions with the aid of the image detection means.

The invention enables a visualization of the cause of the disruption message by one or a plurality of articles being marked, which articles are located in a wrong position or in a wrong alignment on the staging surface and/or in the grouping having been formed up to that point. The marking can be performed by way of color marking. The color marking can be performed by way of paint application. A paint application by way of a paint jet or a paint spray by means of paintballs is, for instance, conceivable. Alternatively or additionally, the color marking can be performed by way of a colored presentation on a display device, preferably a screen, a monitor, or a display, at least of the mispositioned or fallen articles in their present position and arrangement. In this instance, the mispositioned or fallen articles can preferably be presented in wrong colors and thus be highlighted in contrast to remaining articles in a grouping having been formed up to that point, which articles are optionally also presented. Alternatively or additionally, it is conceivable to use a flashing presentation in order to mark and highlight mispositioned or fallen articles on a display device over and above the image additionally presented by an image detection means of the remaining articles in a grouping having been formed up to that point. Alternatively or additionally, one or a plurality of articles, which are located in a wrong position or in a wrong alignment on the staging surface and/or in the grouping having been formed up to that point, are marked directly on the staging surface by way of a projection.

A particularly effective embodiment of the method according to the invention provides that the desired state of the articles having been grouped up to that point and/or of the grouping to be achieved are displayed at the same time. This can be performed on the same display device, preferably a screen, a monitor, or a display, on which the disruption message is issued as well and/or on which the present position and arrangement at least of mispositioned or fallen articles is presented. It is also conceivable, as an alternative or in addition, to also present this directly on the staging surface by means of a projection.

In this manner it is possible to display the cause of the disruption message in a particularly clear manner and at the same time enable the quickest possible removal of the cause of the disruption message. The invention thus creates instructions and therefore a facilitation and acceleration in removing the cause of the disruption message.

The simultaneous display of mispositioned or fallen articles and of the desired state of the articles having been grouped up to that point and/or of the grouping to be formed can be performed as an overlay, a juxtaposition, or an alternating rendition of an image of the actual state and of an image of the desired state.

An advantageous embodiment of the invention provides that the grouping is preferably not continued from the very beginning on, but rather particularly preferably independently continued from a suitable grouping step on, as soon as a state has been reestablished which corresponds to a grouping to be formed up to that point from the articles located on the staging surface, which grouping is present at the end of a grouping step preceding the disruption message or at the end of the grouping step during which the disruption message occurred.

It is conceivable to provide a fully automatic removal of the disruption by way of the detected actual alignments and actual positions and by comparison with the desired alignments and desired positions of the articles that have undergone a grouping up to that point by recognizing those articles, for instance by way of their marking, that are not located in the desired alignment and in the desired position within an arrangement to have been formed up to that point for a grouping to be achieved, and by bringing them from their actual alignment and/or their actual position into their required desired alignment and/or desired position by means of one or a plurality of manipulators providing the grouping on the staging surface.

Also conceivable is an active support in removing the cause of a disruption message. In dependence on the error pattern, it is possible to present on the display device by the removal and/or rotation and/or shifting of which mispositioned article or which mispositioned articles an arrangement of articles specified by a grouping to be achieved corresponds to the desired state of a grouping having been formed up to that point from the articles located on the staging surface. In this way, it is possible to prevent false corrections. If the desired state of a grouping having been formed up to that point is attained, a release can be issued and the grouping station can be put back into operation. Furthermore, if there is a false correction of the then present actual state, a new solution can be presented on the display device.

The invention enables a real-time correction verification of a necessary correction of the articles, which correction is performed automatically or manually, for instance by the operating personnel of a grouping station. This is attained in that the grouping station, in a disruption due to mispositioned or fallen articles, detects the error and thus the cause of the disruption, preferably with the aid of an imaging sensor, and marks the mispositioned or fallen articles having caused the disruption by not only displaying the desired depiction on a display device, but also the actual depiction, for example. The operating personnel thus sees both depictions on the display device and only has to shift or move the mispositioned or fallen articles to the correct position and/or to remove the mispositioned or fallen articles and substitute them, if required. When this has been accomplished, the grouping station can then verify once more, preferably with the aid of the imaging sensor, if all articles having been grouped up to that point are correctly positioned. If that is the case, the release is issued. Otherwise, the procedure is restarted again.

A second object of the invention relates to a device for performing a method as previously described. The device comprises one or a plurality of sensors, each covering a monitoring area on their own or together, for detecting articles in their actual alignments and actual positions, which articles have been brought into the monitoring area. In this case, the at least one sensor monitors the monitoring area, preferably by surveying it completely, and issues sensor signals, which are dependent on the actual alignments and actual positions of the articles having been brought into the monitoring area up to that point. One or a plurality of sensors are arranged here such that they can detect and follow up the articles entering into the monitoring area as well as their present actual alignment and actual position.

Coupled with the at least one sensor is a processor, which determines the actual alignments and actual positions of the articles having been brought into the monitoring area up to that point by means of the sensor signals.

The device furthermore comprises means for marking one or a plurality of articles having been brought into the monitoring area up to that point, of which one or a plurality of actual alignments and/or actual positions do not correspond to one or a plurality of specified desired alignments and desired positions of the articles having been brought into the monitoring area up to that point.

One or a plurality of these means for marking one or a plurality of articles having been brought into the monitoring area up to that point, of which one or a plurality of actual alignments and/or actual positions do not correspond to one or a plurality of specified desired alignments and desired positions of the articles having been brought into the monitoring area up to that point, can be designed as previously described in connection with the method, for instance as a display device, a projection device, or a paint applicator device.

Preferably, the device also comprises a display device coupled with the processor, preferably a screen, a monitor, or a display, on which the disruption message can be issued, if one or a plurality of actual alignments and/or actual positions of the articles having been brought into the monitoring area up to that point do not correspond to one or a plurality of specified desired alignments and desired positions of the articles having been brought into the monitoring area up to that point.

Coupled with the processor, the device preferably has a data storage means, in which all desired alignments and desired positions of all articles to be arranged into a grouping within the monitoring area are stored, both in their final alignments and final positions within the grouping to be achieved and also during their transfers from their entry alignments and entry positions into their final alignments and final positions.

Particularly preferably, the device has a processor coupled with the at least one sensor and the data storage means, with the aid of which processor a comparison with the desired alignments and desired positions stored in the data storage means can be conducted at each point of time during the grouping by means of the actual alignments and the actual positions of the articles as recognized by the image detection means. Such a continuous comparison makes it possible to recognize at an early stage a deviation from the disruption-free operation and, as the case may be, prevent the destruction of one or a plurality of articles by the early issue of a disruption message. The processor can be the same one, which determines the actual alignments and actual positions of the articles having been brought into the monitoring area up to that point.

At least one sensor preferably is an imaging sensor, preferably at least one camera, particularly preferably at least one video camera. In this instance, an image detection means carries out the determination of the actual positions and the actual alignments of the articles having been brought into the monitoring area up to that point. The processor, in this context, executes an object recognition algorithm, by means of which the articles having been brought into the monitoring area up to that point can be recognized in the image detected by the imaging sensor and by means of which their actual positions and the actual alignments can be determined. The articles within the area being monitored by the image detection corresponding to the monitoring area are recognized by the object recognition algorithm in their actual alignment and actual position in the image detected by the at least one imaging sensor.

The means for marking one or a plurality of articles having been brought into the monitoring area up to that point, of which one or a plurality of actual alignments and/or actual positions do not correspond to one or a plurality of specified desired alignments and desired positions of the articles having been brought into the monitoring area up to that point, can comprise means for applying paint to mispositioned and/or fallen articles in the monitoring area. The means for paint application can be one or a plurality of paint spray devices and/or paintball shooting devices for the color marking of mispositioned and/or fallen articles in the monitoring area.

Particularly preferably, the means for marking one or a plurality of articles having been brought into the monitoring area up to that point, of which one or a plurality of actual alignments and/or actual positions do not correspond to one or a plurality of specified desired alignments and desired positions of the articles having been brought into the monitoring area up to that point, comprise a display device coupled with the processor, preferably a screen, a monitor, or a display, for instance that display device on which a disruption message can be issued. In this instance, the image detected by the at least one imaging sensor is issued on the display device, and the marking in this context provides those articles that have been brought into the monitoring area to be highlighted, for instance with regard to coloring, such as by wrong colors, and/or by flashing, of which articles one or a plurality of actual alignments and/or actual positions do not correspond to one or a plurality of specified desired alignments and desired positions of a grouping to be produced from the articles having been brought into the monitoring area up to that point.

Alternatively or additionally, it is possible to show an overlay or a juxtaposition on the display device of the image detected by the at least one imaging sensor with a desired state of a grouping to be produced from the articles having been brought into the monitoring area up to that point and/or of the grouping to be formed.

The device can be part of a grouping station as described in the beginning, which can be operated fully automatically. As previously described by way of example, the grouping station comprises a movable or stationary staging surface and also one or a plurality of manipulators that are preferably designed as single- or multi-axle handling machines. The monitoring area surveyed by the at least one sensor preferably covers the entire staging surface. The one or more manipulators form one grouping after the other on the staging surface from articles of a single- or multi-lane incoming article flow. The groupings are continuously transported away after their completion in order to make space for a new grouping.

In the process, the articles are detected by sensor with regard to their entry alignment and/or entry position in the single- or multi-lane incoming article flow in order to subsequently bring them into a final alignment and final position on the staging surface corresponding to their arrangement in the grouping to be achieved by means of, for instance, one or a plurality of manipulators.

It is obvious that the invention can be realized by a real-time monitoring of articles arriving in an entry alignment and/or entry position from a single- or multi-lane incoming article flow during their transfer from their entry alignments and entry positions into their final alignments and final positions within a grouping of a plurality of articles to be produced, said real-time monitoring being carried out by means of at least one imaging sensor, such as a camera, preferably a video camera, and by means of the marking of articles, which are causing a disruption and a standstill of the grouping or, as the case may be, of a facility performing this grouping, such as a grouping station. An identification of the articles that are the cause of a disruption and thus of an associated disruption message is performed by way of the marking. The time required for removing the disruption and thus the standstill of the facility is shortened by this identification, because only that article or those articles has or have to be brought into its or their desired alignment and/or desired position or has or have to be substituted, of which the actual position during and/or after the transfer does not correspond to the desired position. A reduction of rejects is thus also achieved, because, for instance, mispositioned or fallen articles can at least be brought into their desired alignment and/or desired position without completely emptying the staging surface. Over and above that, only damaged articles, as the case may be, have to be substituted.

The advantages in comparison to the prior art are, among others, a real-time or live support of the operating personnel in troubleshooting after a previous disruption message, for instance. For this purpose, the desired state and the actual state can be issued on the display device by way, for instance, of a simplified diagram, to support the operating personnel in troubleshooting. In this context, one or a plurality of sensors, preferably a camera, monitoring the staging surface, preferably permanently checks the actual state and permanently compares it with the desired state in the control means formed by the processor coupled with the at least one sensor or camera and with the data storage means connected to the processor. The two states are displayed by way of a simplified diagram, for instance, in different colors. It the effective position of an article is changed, which article was recognized by an object recognition algorithm in the context of an image detection, for example, this is simultaneously displayed on the display device. As soon as actual state and desired state correspond to each other, a positive feedback can be issued and the grouping station can be put back into operation.

Other advantages in comparison to the prior art are a considerable time saving in removing the causes of disruption messages together with a reduction of standstills. The time saving, in this context, is independent of the cause of the disruption, as a disruption occurring in the prior art requires the operating personnel to first check whether mispositioned and/or fallen articles are the cause of the disruption. The invention allows this step to be omitted, if the disruption message is shown to have a different cause. The operating personnel can immediately recognize this, because in such a case no articles are marked, so that the search for the cause of such a disruption message can directly be taken up elsewhere.

Additional advantages in comparison to the prior art lie in considerably reducing the complexity of troubleshooting, as, on the one hand, the operating personnel no longer needs to identify the articles causing the disruption; instead, the articles causing the disruption are identified, for instance, on a display device or on the staging surface, preferably by way of color marking, and as, on the other hand, the operating personnel is not required to elaborate their own and perhaps wrong solution strategy in their mind; instead they only have to execute, for example, presented steps, which are indicated, for example, on the display device, in order to eliminate the cause of the disruption message. It is furthermore possible to have the image detection means support the operating personnel at any time even in the execution of these simple steps.

It is important to emphasize that in contrast to the prior art, the invention allows removing the disruption without having to remove the articles from the staging surface. Thus, a significant reduction of rejects is achieved.

In the following passages, the attached figures further illustrate exemplary embodiments of the invention and its advantages. The same or equivalent elements of the invention are designated by identical reference characters. Furthermore and for the sake of clarity, only the reference characters relevant for describing the respective figure are provided. The size ratios of the individual elements in the figures do not necessarily reflect the real size ratios. It is to be understood that in some instances various aspects of the invention may be shown exaggerated or enlarged in relation to other elements to facilitate an understanding of the invention.

DETAILED DESCRIPTION OF THE INVENTION

It should be understood that the detailed description and specific examples of the method according to the invention and of a device according to the invention for performing such a method for reporting disruption in handling articles, in particular in grouping articles, while indicating preferred embodiments, are intended for purposes of illustration only and are not intended to limit the scope of the invention.

Figure 1:
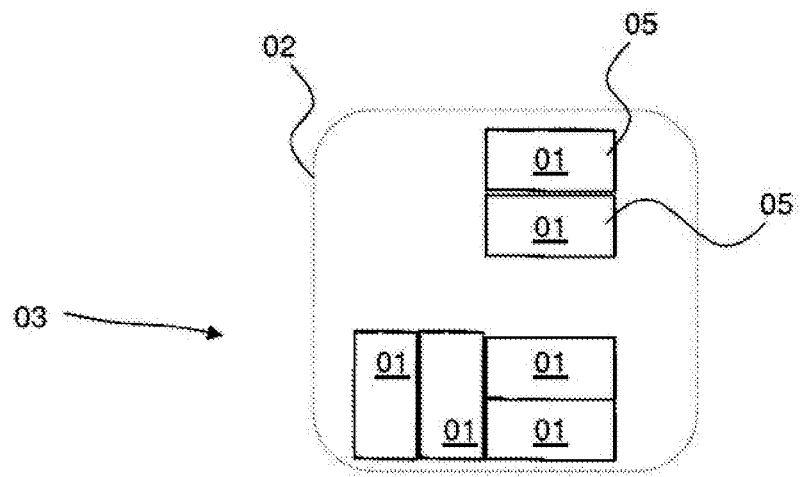
FIG. 1 shows an actual state with the effective actual alignments and actual positions of articles located on a staging surface in their arrangement having been formed by the manipulation up to that point.
Figure 2:
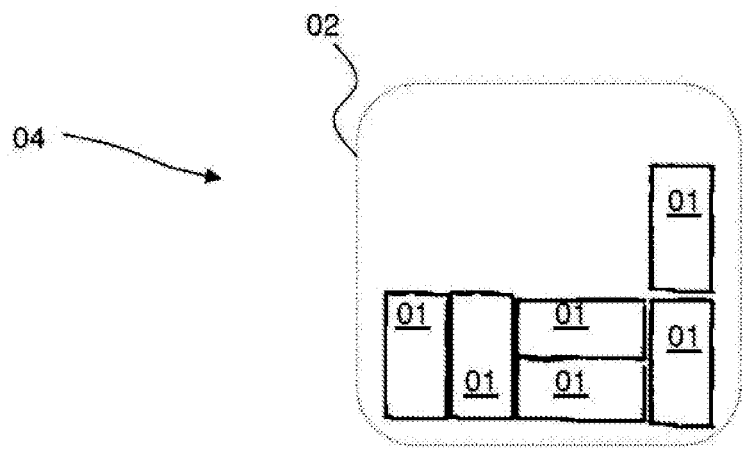
FIG. 2 shows a desired state with the desired alignments and desired positions of articles located on a staging surface in a grouping to be formed by the manipulation up to that point from the articles located on the staging surface.

During a grouping of articles, in which articles 01 from a single- or multi-lane incoming article flow are continually grouped into article layers, for instance, on a movable staging surface, for instance on a staging surface 02 that is moved along at least in sections with the article stream, or on a stationary staging surface 02, and in which the article layers are then further transported or transported away after each completion in order to make space for a new grouping to be grouped, it can happen that an actual state 03 as illustrated in FIG. 1 with the effective actual alignments and actual positions of articles 01 located on the staging surface 02 does not conform in their arrangement having been formed up to that point by the manipulation with a desired state 04 as illustrated in FIG. 2 with the desired alignments and desired positions of the articles 01 to be achieved of articles 01 located on a staging surface 02 in a grouping to be formed up to that point from the articles 01 that are located on the staging surface 02.

In the instance of such a situation, in which an actual state 03, for instance, no longer corresponds within specified tolerance limits to a desired state 04, the grouping is preferably stopped in order to prevent a damage both to the articles 01 and to parts of the facility, for instance to a grouping station, which provides the grouping. The stop is preferably performed simultaneously with the issue of a disruption message, for instance, by way of an alarm sound and/or a warning light and/or by the presentation of the corresponding information on a display device arranged, for example, directly at the facility and/or in a machine control center.

To be able to recognize such a situation, the articles 01 in the grouping are not only detected by sensor with regard to their entry alignment and/or entry position in the single- or multi-lane incoming article flow in order to subsequently bring them into a final alignment and final position corresponding to their arrangement in the grouping to be achieved, for instance, with the aid of one or a plurality of manipulators, but the articles 01 located on the staging surface 02 in the arrangement having been formed up to that point by the manipulation and corresponding to the actual state 03 are also detected by sensor in order to recognize mispositioned or fallen articles 05.

In this context, the effective actual alignments and actual positions of the articles 01 located on the staging surface 02 are first acquired by way of the sensor detection of the articles 01 located on the staging surface 02 according to an actual state 03.

Subsequently, mispositioned or fallen articles 05 are recognized by comparing the effective actual alignment and the actual position of the articles 01 located on the staging surface 02 in the actual state 03 in their arrangement having been formed up to that point by the manipulation with a desired alignment and a desired position of the articles to be achieved in a grouping to have been formed up to that point according to the desired state 04 by the manipulation from the articles that are located on the staging surface.

If it is recognized during the preferably permanently performed monitoring by means of sensor detection of the articles having been grouped up to that point and by the comparison of the actual alignments and actual positions of the articles 01 on the staging surface 02 with the desired alignment and the desired position of the articles 01 to be achieved in a grouping to have been formed up to that point by the manipulation from the articles that are located on the staging surface 02 that one or a plurality of articles 05 is located in a wrong position or in a wrong alignment, a disruption message is preferably issued and the grouping is preferably interrupted by stopping the facility performing the grouping.

In the instance of a situation in which an actual state 03 does not correspond within specified tolerance limits to a desired state 04, and in this context it was recognized that one or a plurality of articles 01 are located in a wrong position or in a wrong alignment and that accordingly there is at least one mispositioned article 05, it is possible, as an alternative or in addition to an issue of a disruption message as well as to an interruption of the grouping, to perform an automatic removal of the disruption with the aid of a robot, for instance, by way of modifying the position and/or the alignment of the one or of the plurality of articles 05, which is or are in a wrong position.

The robot in particular comprises at least one gripper arm, with which it can grip, shift, rotate, and/or move one or a plurality of articles 05, which are misaligned or mispositioned, and subsequently move them into a desired position and/or align them in a desired alignment.

In order to accelerate the search for the cause of the disruption message and in order to facilitate a removal of the cause of the disruption at the same time, it is provided that together with the disruption message the one or the plurality of articles 05 are marked, preferably with a marking 06, which articles are located in a wrong position or in a wrong alignment on the staging surface 02 and/or in the grouping having been formed up to that point from the articles 01 located on the staging surface 02, for instance because they were lost or have fallen while being brought to a position corresponding to their final position within a grouping to be formed.

Preferably, the sensor detection of the actual state 03 with the actual alignment and the actual position of the articles 01 on the staging surface 02 is performed with the aid of image detection as is known by way of cameras, for instance by means of one or a plurality of imaging sensors, and also by an object recognition algorithm with which the articles 01 can be recognized with regard to their alignment and arrangement within the area being monitored by the image detection means, which preferably covers the entire staging surface 02.

The issue of the disruption message can then be performed with the simultaneous presentation on a display device, such as a screen, a monitor, or a display, of the image detected with the aid of the image detection means and/or of the articles 01 recognized with the aid of the image detection means on the staging surface 02 in their actual alignments and actual positions.

Figure 3:
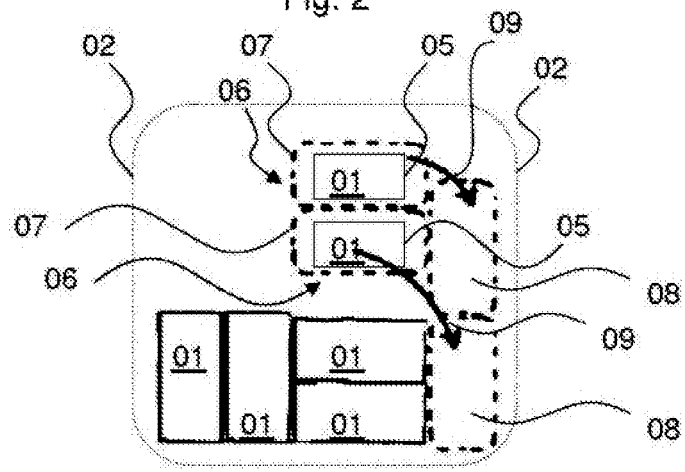
FIG. 3 shows a marking of articles that are mispositioned and/or misaligned in the actual state as compared to the desired state, including a presentation of instructions for correcting their misposition and/or misalignment in order to produce the desired state from the actual state.

In this instance, it is particularly advantageous that the marking 06 that is provided as the case may be, is performed by marking the one or the plurality of articles 05, which are in a wrong position or in a wrong alignment on the staging surface 02 and/or in the grouping having been formed up to that point from the articles 01 located on the staging surface 02, by presenting on a display device the image of the actual state 03 detected by the at least one imaging sensor, in which context the mispositioned or fallen articles 05 are marked and thus highlighted, for example by a colored presentation, for example in wrong colors, provided that the image detection and its presentation is performed in color, and/or by a border 07 as exemplarily shown in FIG. 3.

Likewise conceivable is a marking 06, provided as the case may be, and thus a highlighting of mispositioned, for instance fallen articles 05 in the image presented on the display device and detected with the aid of the image detection means, by superimposing a diagram which overlays the presentation of a mispositioned article 05 at its place of presentation on the display device in its actual position and actual alignment and also, as the case may be, in its actual extension. Such a diagram can be overlayed with a flashing signal, for instance.

Generally, the entire actual state 03 as well as a desired state 04 that is shown on a display device, as the case may be, can also be carried out by way of a diagram, for instance, without presenting an actually detected image.

Alternatively conceivable for the marking 06, provided as the case may be, is an application of paint to mispositioned articles 05, which can be performed, for instance, by means of a paint jet or a paint spray by means of a shot from a paintball onto a mispositioned article 05.

It is furthermore possible to provide an active support in removing the cause of a disruption message, as is illustrated in FIG. 3. In this context and in dependence on the error pattern, it is possible to present on the display device by the removal and/or rotation and/or shifting of which at least one mispositioned article 05 an arrangement of articles 01 specified by a grouping to be achieved corresponds to the desired state 04 of a grouping to have been formed up to that point from the articles 01 located on the staging surface 02. In addition to a marking 06 of the at least one mispositioned article 05, a placeholder 08 for the at least one mispositioned article 05 can be displayed for this purpose in a presentation on a display device, where, if the mispositioned article 05 is shifted or brought from its actual position and actual alignment into a corresponding desired alignment and desired arrangement to the location of the placeholder 08, the desired state 04 is attained, in which the previously mispositioned article 05 is located in correct position and alignment and the grouping can continue to be carried out. In this context, arrows of movement 09 can support the presentation of the moving or shifting.

In this way, it is possible to prevent false corrections. If the desired state 03 of a grouping having been formed up to that point is attained, a release can be issued and the grouping station can be put back into operation. Furthermore, if there is a false correction of the then present actual state, a new solution can be presented on the display device.

A device that is suitable for performing the previously described method comprises one or a plurality of sensors preferably surveying a monitoring area including the staging surface 02. These sensors issue sensor signals, which are dependent on the actual alignments and actual positions of articles 01 having been brought into the monitoring area up to that point. The sensors are arranged in such a manner that the actual alignment and the actual position of the articles 01 entering into the monitoring area can be detected and followed up. Coupled with the at least one sensor, the device furthermore comprises a processor, which determines the actual alignments and actual positions of the articles 01 having been brought into the monitoring area up to that point by means of the sensor signals. In order to carry out the marking 06, the device moreover comprises corresponding means for the marking 06 of one or a plurality of articles 05 having been brought into the monitoring area up to that point, of which articles 05 one or a plurality of actual alignments and/or actual positions forming an actual state 03 do not correspond to one or a plurality of specified desired alignments and desired positions forming a desired state 04 of the articles 01 having been brought into the monitoring area up to that point.

At least one sensor preferably is an imaging sensor surveying the monitoring area, preferably at least one camera, particularly preferably at least one video camera. An image detection means then carries out the determination of the actual positions and the actual alignments of the articles having been brought into the monitoring area up to that point. The processor, in this context, executes an object recognition algorithm, by means of which the articles 01 having been brought into the monitoring area up to that point can be recognized in the image detected by the imaging sensor and by means of which their actual positions and the actual alignments can be determined.

The means for the marking 06 of one or a plurality of articles 05 having been brought into the monitoring area up to that point, of which one or a plurality of actual alignments and/or actual positions do not correspond to one or a plurality of specified desired alignments and desired positions of the articles 01 having been brought into the monitoring area up to that point, can comprise means for applying paint to mispositioned and/or fallen articles 05 in the monitoring area. The means for paint application can be one or a plurality of paint spray devices and/or paintball shooting devices, for example, for the color marking of mispositioned and/or fallen articles in the monitoring area.

Alternatively, the means for marking 06 can comprise a display device coupled with the processor, on which a disruption message is issued if one or a plurality of actual alignments and/or actual positions of the articles 01 having been brought into the monitoring area up to that point do not correspond to one or a plurality of specified desired alignments and desired positions of the articles 01 having been brought into the monitoring area up to that point, and/or on which an image detected by at least one sensor designed as an imaging sensor and surveying the monitoring area is issued. The marking 06, in this context, can provide the or those articles 05 that have been brought into the monitoring area to be highlighted, for instance with regard to coloring, such as by wrong colors, and/or by flashing, of which articles 05 one or a plurality of actual alignments and/or actual positions do not correspond to one or a plurality of specified desired alignments and desired positions of a grouping to be produced from the articles 01 having been brought into the monitoring area up to that point. Alternatively or additionally, it is possible to show a desired state 04 on the display device of a grouping to be produced from the articles 01 having been brought into the monitoring area up to that point and/or of the grouping to be produced.

Coupled with the processor, the device can comprise a data storage means, in which all desired alignments and desired positions of all articles 01 to be arranged into a grouping within the monitoring area are stored, both in their final alignments and final positions within the grouping to be achieved and also during their transfers from their entry alignments and entry positions into their final alignments and final positions, such that it is possible to conduct a comparison at any point of time during the grouping of the actual alignments and the actual positions of the articles 01 having been brought into the monitoring area as recognized with the aid of the sensor signals with the desired alignments and desired positions stored in the data storage means.

The device can be part of a grouping station, which comprises a movable staging surface 02, for instance, that is moved along at least in sections with the article stream, or a stationary staging surface 02, and also one or a plurality of manipulators preferably designed as single- or multi-axle handling machines, which form one grouping after the other on the staging surface 02 from articles 01 of a single- or multi-lane incoming article flow, which groupings are continuously transported away after their completion in order to make space for a new grouping. The monitoring area surveyed by the at least one sensor preferably covers the entire staging surface. The articles are detected by sensor with regard to their entry alignment and entry position in the single- or multi-lane incoming article flow in order to subsequently bring them into a final alignment and final position on the staging surface corresponding to their arrangement in the grouping to be achieved by means of, for instance, at least one manipulator.

It is important to emphasize that, as an alternative or in addition, the marking 06 and/or the presentation of the desired state 03 and/or the presentation of the border 07 and/or the presentation of one or a plurality of placeholders 08 and/or the presentation of one or a plurality of arrows of movement 09 can be performed or carried out directly on the staging surface 02 by a projection, preferably a light projection by means of an optical projection device. Suitable optical projection devices are, for instance, video projectors such as are known in German as "Beamers" and/or concentrated and, as the case may be, moving light beams as are known, for instance, from laser pointers, with which mispositioned articles 05 can be illuminated by way of their marking 06, or by means of the movement of which borders 07 and/or placeholders 08 and/or arrows of movement 09 can be projected onto the staging surface 02, in order to further facilitate, for instance, the recognition and/or the removal of the cause of a disruption message.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

The invention is commercially applicable, for instance, in the production and operation of facilities for handling articles.

LIST OF REFERENCE CHARACTERS

01 Article
02 Staging surface
03 Actual state
04 Desired state
05 Mispositioned article
06 Marking 07 Border
08 Placeholder
09 Arrow of movement

I claim:

1. A method for reporting disruption in the grouping of articles (01), comprising:
grouping articles (01) from an incoming article flow on a staging surface (02);
detecting, with at least one sensor, an effective actual alignment and an actual position (03) of the articles (01) located on the staging surface (02); and
comparing the effective actual alignment and actual position (03) of the articles (01) located on the staging surface (02) with a desired alignment and a desired position in a desired state (04) of the articles (01);
wherein if the comparison reveals that one or more of the articles (05) is mispositioned or misaligned:
issuing of a disruption message;
interrupting of the grouping;
automatically removing the disruption by modifying the position or the alignment of the one or more of the mispositioned or misaligned articles (05); or
combinations thereof.

2. The method of claim 1, further comprising marking one or more of the mispositioned or misaligned articles (05).

3. The method of claim 2, wherein marking (06) comprises:
color marking;
displaying an image of mispositioned or misaligned articles (05) on a display device over an image of the remaining articles (01) in the grouping having been formed up to that point;
projecting light onto the mispositioned or misaligned articles (05) on the staging surface (02); or
combinations thereof.

4. The method of claim 3, wherein the color marking comprises:
applying paint;
displaying a colored image of the at least of mispositioned or misaligned articles (05) in their present actual position and arrangement (03) on a display device;
displaying an image of the at least of mispositioned or misaligned articles (05) in their present actual position and arrangement (03) in contrasting colors;
projecting of a colored light at least onto mispositioned or misaligned articles (05) in their present actual position and arrangement (03) on the staging surface (02); or
combinations thereof.

5. The method of claim 3, wherein the at least one sensor is an image detection sensor.

6. The method of claim 5, further comprising issuing the disruption message simultaneously with the displaying the image of mispositioned or misaligned articles (05) on a display device.

7. The method of claim 6, further comprising simultaneously displaying the desired state (04) of the articles (01).

8. The method as recited in claim 7, wherein the simultaneous display of the desired state (04) of the articles (01) is displayed on the same display device on which the disruption message is also issued and/or on which the present position and arrangement at least of mispositioned or misaligned articles (05) is displayed and/or projected onto the staging surface (02).

9. The method of claim 7, wherein the simultaneous display of mispositioned or misaligned articles (05) and of the desired state (04) of the articles (01) is by way of overlay, juxtaposition, or alternating display of an image of the actual state (03) and of an image of the desired state (04) on a display device and/or by projection onto the staging surface (02).

10. The method of claim 1, further comprising:
reestablishing the desired state (04) corresponding to a grouping that is present at the end of a grouping step preceding the disruption message or at the end of the grouping step during which the disruption message occurred; and
continuing the grouping of articles (01) from the reestablished desired state (04).

11. The method of claim 10, wherein one or manipulators automatically brings the one or more mispositioned or misaligned articles (05) from their actual alignment and/or their actual position (03) into their desired state (04) of alignment and/or position.

12. The method of claim 10, further comprising displaying on a display device, a desired step to achieve the desired state (04) of a grouping to be formed up to that point from the articles (01) located on the staging surface (02), wherein the desired step includes removing, rotating, and or shifting mispositioned or misaligned articles (05).

13. A device for reporting disruption in the grouping of articles, comprising:
one or of more sensors surveying a monitoring area, which sensors issue sensor signals indicating the actual alignments and actual positions (03) of articles (01) having been brought into the monitoring area,
a processor coupled with the one or more sensors to determine from the sensor signals the actual alignments and actual positions (03) of the articles (01) having been brought into the monitoring area, and
a means for marking (06) one or more articles (05) that have been brought into the monitoring area where the actual alignments and/or actual positions (03) do not correspond to one or more desired states (04) of alignments and/or positions of the articles (01).

14. The device of claim 13, further comprising a display device coupled with the processor, on which display device:
a disruption message is issued, if one or more of the actual alignments and/or actual positions (03) of the articles (01) having been brought into the monitoring area up do not correspond to one or more desired state (04) of alignments and/or positions of the articles (01) having been brought into the monitoring area up to that point, and/or
an image detected by at least one sensor surveying the monitoring area and being designed as an imaging sensor is issued, wherein the marking (06) provides the article (05) or those articles (05) that has or have been brought into the monitoring area to be highlighted, for instance with regard to coloring, such as by wrong colors, and/or by flashing, of which articles (05) one or a plurality of actual alignments and/or actual positions (03) do not correspond to one or more desired state (04) of alignments and/or positions of a grouping to be produced from the articles (01) having been brought into the monitoring area up to that point, and/or
a desired state (04) of a grouping to be produced from the articles (01) having been brought into the monitoring area up to that point, and/or
the grouping to be formed is presented.

15. The device of claim 14, further comprising:
a data storage means coupled with the processor, in which data storage means all desired states (04) of all articles (01) to be arranged into a grouping within the monitoring area are stored, both in their final alignments and final positions within the grouping to be achieved and also during their transfers from their entry alignments and entry positions into their final alignments and final positions, such that it is possible to conduct a comparison at any point of time during the grouping of the actual alignments and the actual positions (03) of the articles (01) having been brought into the monitoring area as recognized by means of the sensor signals with the desired states (04) as stored in the data storage means, and at least one sensor surveying the monitoring area and being an imaging sensor, wherein the determination of the actual positions and actual alignments (03) of the articles (01) having been brought into the monitoring area up to that point is performed by means of an image detection, wherein the processor executes an object recognition algorithm by means of which the articles (01) having been brought into the monitoring area up to that point are recognized in the image detected by the imaging sensor and by means of which their actual positions and the actual alignments (03) are determined.

16. The device of claim 15, further comprising a staging surface (02) and one or more manipulators, wherein the monitoring area being surveyed by the at least one sensor covers at least the staging surface (02), wherein the articles (01) are detected by sensor with regard to their entry alignment and/or entry position in the article flow, and the articles (01) are brought into a final alignment and final position on the staging surface (02) corresponding to their arrangement in the grouping to be achieved by means of at least one manipulator.

* * * * *